United States Patent
Kechriotis (10) Patent No.: US 6,532,484 B1
(45) Date of Patent: Mar. 11, 2003

(54) PARALLEL SYSTEM AND METHOD FOR PERFORMING FAST FOURIER TRANSFORM

(75) Inventor: George Kechriotis, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/337,587

(22) Filed: Jun. 21, 1999

(51) Int. Cl.$^7$ ................................................ G06F 17/10
(52) U.S. Cl. ........................................................ 708/404
(58) Field of Search ................................ 708/400–404, 708/409

(56) References Cited

U.S. PATENT DOCUMENTS

| | | | | |
|---|---|---|---|---|
| 3,754,128 A | * | 8/1973 | Corinthios | 708/400 |
| 5,297,070 A | * | 3/1994 | Hua et al. | 708/404 |
| 5,717,620 A | | 2/1998 | Williams | |
| 5,835,392 A | | 11/1998 | Dulong et al. | |
| 5,941,940 A | | 8/1999 | Prasad et al. | |
| 6,006,245 A | * | 12/1999 | Thayes | 708/404 |
| 6,081,821 A | * | 6/2000 | Hopkinson et al. | 708/404 |
| 6,304,887 B1 | * | 10/2001 | Ju et al. | 708/404 |

* cited by examiner

*Primary Examiner*—Tan V. Mai
(74) *Attorney, Agent, or Firm*—Meyertons Hood Kivlin Kowert & Goetzel, P.C.; B. Noël Kivlin

(57) ABSTRACT

A parallel FFT generating system is disclosed for generating a Fast Fourier Transform (FFT) of an input vector. The parallel FFT generating system includes a plurality of processes configured to receive the input vector and process the input vector in parallel in relation to a set of twiddle factors to generate an output vector, the output vector comprising a Fourier transform representation of the input vector.

13 Claims, 5 Drawing Sheets

PROC 12(0): COL (0) | COL (1) | ... | COL ($n_2/p-1$) | COL ($n_2/p$) | COL ($n_2/p+1$) | ...

PROC 12(1): ... | COL ($2n_2/p-1$) | ...

PROC 12(P-1): COL (($p-1)n_2/p$) | COL (($p-1)n_2/p+1$) | ... | COL ($n_2-1$)

FIG. 4B

PROC 12(0): COL (($p-1)n_2/p$) | COL (($p-1)n_2/p+1$) | ... | COL ($n_2-1$) | COL (($p-2)n_2/p$) | ... | COL (($p-1)n_2-1$)

PROC 12(1): ...

PROC 12(P-1): COL (0) | COL (1) | ... | COL ($n_2/p-1$)

FIG. 4C

PROC 12(0): COL (($p-1)n_2/p$) | COL (($p-1)n_2/p+1$) | ... | COL ($n_2-1$) | COL (0) | COL (($p-2)n_2/p$) | ... | COL (($p-1)n_2-1$)

PROC 12(1): ...

PROC 12(P-1): COL (($p-2)n_2/p$) | ... | COL (1) | COL ($n_2/p-1$)

PARALLEL SYSTEM AND METHOD FOR PERFORMING FAST FOURIER TRANSFORM

FIELD OF THE INVENTION

The invention relates generally to the field of digital computer systems, and more particularly to systems and method for performing fast Fourier transforms (FFT's) in parallel on a digital computer system comprising a plurality of processors.

BACKGROUND OF THE INVENTION

The Fourier transform is used in many applications, including, for example, seismic signal analysis and signal processing. A Fourier transform of a sequence of, for example, spatial or temporal data, in which the data identifies the amplitude of a signal as a function of space or time, transforms the data into the frequency domain. The transformed data identifies the amplitudes of various frequencies which, when signals of those frequencies are added together, would correspond to the original data signal, and thus identifies the spectral components of the original data signal and the amplitude of each of those components in the original data signal. The spectral information can be processed, using an inverse Fourier transform, to regenerate the original data signal. A Fourier transform can be useful in, for example, removing high- and/or low-frequency noise from a data signal, since the data signal can be transformed to the spectral domain, low- and/or high-frequency components removed, and an inverse Fourier transform applied to the remaining components to generate a filtered data signal which does not contain the removed frequency components. In addition, a Fourier transform can be used in generating a time- or frequency-scaled version of the data signal, as well as the convolution of, or correlation between, two data signals.

Generation of a Fourier transform on a digital computer can be accelerated by use of one of several so-called "FFT" ("fast Fourier transform") algorithms popularized by J. W. Coolly and J. W. Tukey, as described in, for example, W. Press, *Numerical Algorithms in Fortran* (1992: Cambridge University Press), chapter 12. Often the time required to generate a Fourier transform, and the data storage requirements therefor, can be reduced by using so-called "real-to-complex" ("rc-FFT") or "complex-to-real" ("cr-FFT") FFT algorithms. Serial methodologies have been developed for performing an rc-FFT operation on, for example, a single processor in a computer or in a single process. However, it would be preferable to perform the rc-FFT operation on a plurality of processors in a like plurality of processes, or threads of a single process in parallel, to reduce the time required to perform the rc-FFT operation.

SUMMARY OF THE INVENTION

The invention provides a new and improved system and method for performing an FFT operation on a computer comprising a plurality of processors in parallel.

In brief summary, the invention provides a parallel FFT generating system for generating a FFT of an input vector. The parallel FFT generating system comprises a plurality of processes configured to receive the input vector and process the input vector in parallel in relation to a set of twiddle factors to generate an output vector, the output vector comprising a Fourier transform representation of the input vector.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
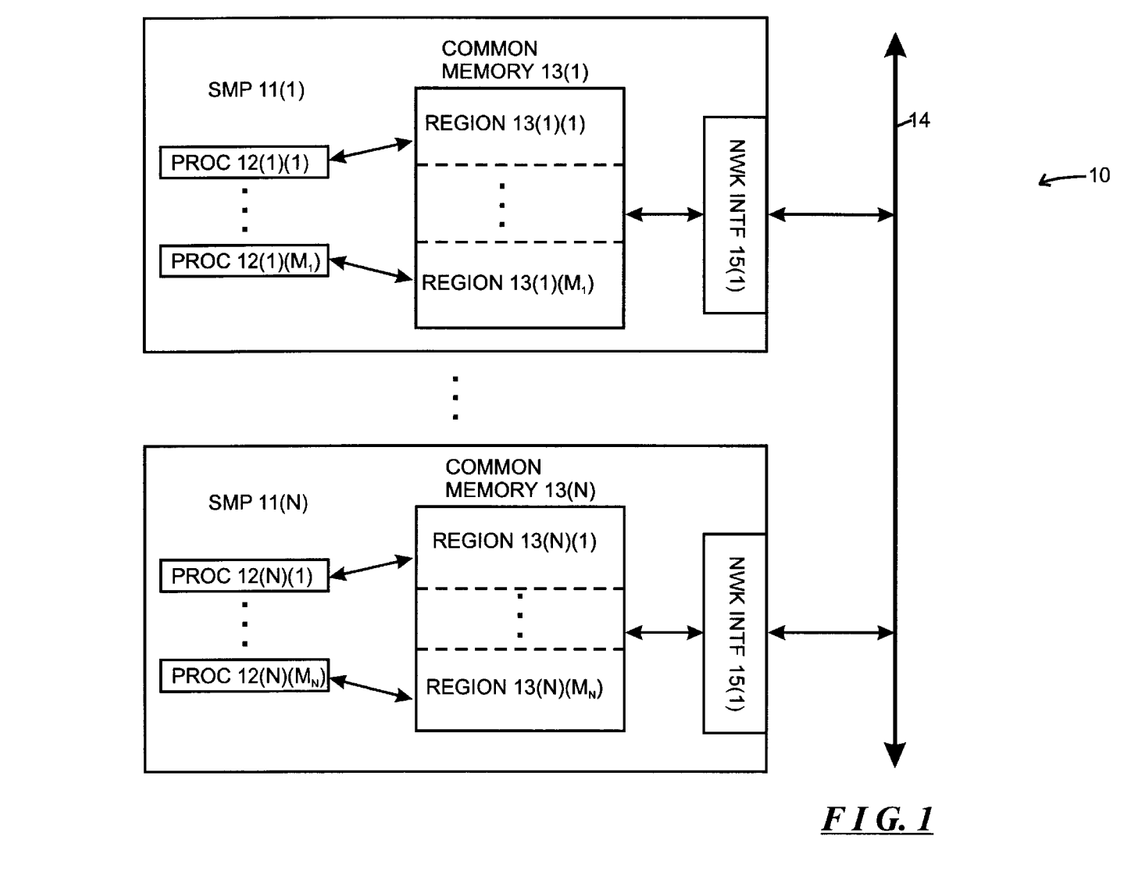
FIG. 1 schematically depicts a computer system including an arrangement for performing a fast Fourier transform ("FFT") operation in parallel, constructed in accordance with the invention.

FIG. 1 schematically depicts a computer system 10 including an arrangement for a performing a fast Fourier transform operation in parallel, constructed in accordance with the invention. Generally, the computer system 10 includes one or more computers 11(1) through 11(N) (generally identified by reference numeral 11(n)), interconnected by a network represented by communication link 14. At least some of the computers 11(n) are constructed along a symmetric multi-processor ("SMP") architecture, with each SMP including hardware resources comprising a plurality of processors (not separately shown) which share common memory resources (also not separately shown). In the following, it will be assumed that the computers 11(n) are all constructed along the lines of an SMP architecture, and may also be referenced as SMP's 11(n). In the computer 10 depicted in FIG. 1, each SMP 11(n) can process in parallel a plurality of processes or threads (generally, "processes") 12(1)(1) through 12(N)(M) (generally identified by reference numeral 12(n)(m)) organized in one or more programs. The processes 12(n)(m) in each SMP 11(n) share a common memory 13(n), with each process being allocated a region 13(n)(m) of the memory 13(n). The total number of processes 12(n)(m) which each SMP 11(n) can execute may be greater than the total number of processors which the respective SMP 11(n) maintains, and, if so, the computer's operating system (not shown) will enable the processes to be executed in a series of time intervals or slots, with selected ones of the processes 12(n)(m) being executed at any point in time.

As noted above, each process 12(n)(m) is allocated a region 13(n)(m) of the common memory 13(n), which it will normally use in its processing operations. Each process 12(n')(m') can, however, communicate with another process 12(n')(m") (m"≠m')) to send information thereto by sending one or more messages thereto. The messages effectively result in the storing of information in the memory region 13(n')(m") of memory 13(n') allocated to that process 12(n')(m"). A number of message passing methodologies which may be used by the processes 12(n)(m) are known to those skilled in the art. After the information has been stored into the memory region 13(n')(m") allocated to that process 12(n')(m"), the process 12(n')(m") can use the information in its processing operations.

As noted above, the SMP's 11(n) are interconnected by a communication link 14. Each SMP also includes a network interface 15(n) to connect the respective SMP 11(n) to the communication link 14 to facilitate transfer of information among the SMP's 11(n), and specifically among processes 12(n)(m) maintained thereby. For example, a process 12(n')(m') can communicate with another process 12(n")(m") (where n"≠n', but m" may equal m') to send information thereto by sending one or more messages thereto. In that case, the messages will be transmitted by the network interface 15(n') of SMP 11(n') and transmitted over the communication link 14 to the network interface 15(n") of SMP 11(n"), and the network interface 15(n") will, in turn, store the information in the memory region 13(n")(m") associated with the process 12(n")(m"). After the information has been stored into the memory region 13(n")(m") allocated to that process 12(n")(m"), the process 12(n")(m") can use the information in its processing operations.

The invention provides an arrangement for controlling the computer system 10 to facilitate performance of a fast Fourier transform ("FFT") operation by a plurality of processes 12(n)(m) operating in parallel, to generate the Fourier transform of input data provided thereto. Generally, the input data will be referred to as an input data vector "x" comprising a number "n" components $x(0), \ldots, x(n-1)$ (generally identified by x(k)), that is, $$x = \begin{bmatrix} x(0) \\ x(1) \\ \vdots \\ x(n-1) \end{bmatrix}.$$

The components x(k) may identify, for example, the amplitude of a signal at successive points in time or space, or other types of data with which the Fourier transform can be used, as will be recognized by those skilled in the art. The transformed data will comprise an output vector "x" comprising a like number of components $x(0)$ through $x(n-1)$ (generally identified by x(k)), that is, $$x = \begin{bmatrix} x(0) \\ x(1) \\ \vdots \\ x(n-1) \end{bmatrix}.$$

Preferably, if the number of processes 12(n)(m) that are to be used in performing the FFT operation is "P," the number "n" of components of the input vector is preferably (but not necessarily) divisible by $4p^2$ In addition, the components x(n) are all real, and do not include complex or imaginary components (that is, components which include $\sqrt{-1}$ as a factor. Although the components x(k) of the input data vector "x" are all real, each even and successive odd pair of components x(k) are considered components of a complex number, thus the input vector x is treated as a complex vector x' having n/2 complex components $x'(0)=x(0), x(1), \ldots, x'(n-2), x'(n-1)$, that is, $$x' = \begin{bmatrix} x(0), x(1) \\ x(2), x(3) \\ \vdots \\ x(n-2), x(n-1) \end{bmatrix}.$$

Figure 2:
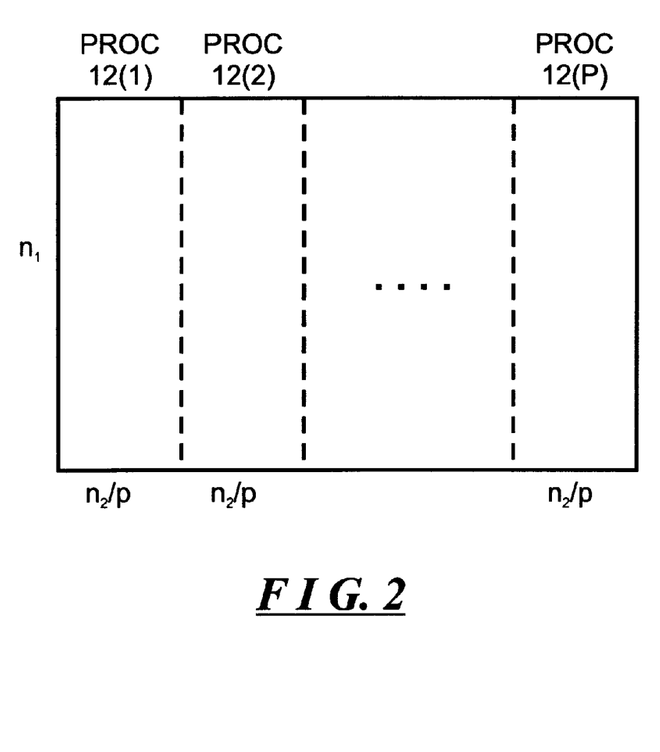
FIGS. 2 through 4 depict layouts of components of arrays comprising data processed during the parallel FFT operation performed by the computer system depicted in FIG. 1.
Figure 5:
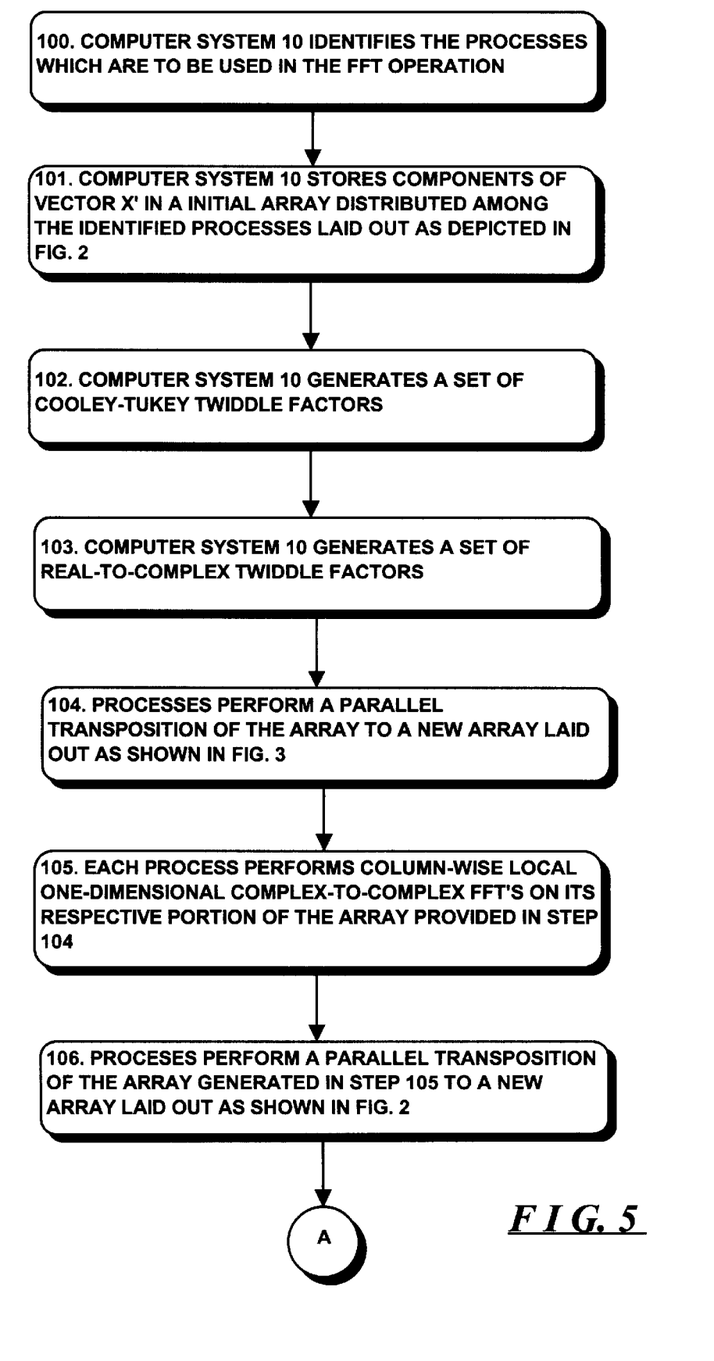
FIGS. 5 and 5A depict operations performed by the computer system in connection with performing the fast Fourier transform operation in parallel.
Figure 5A:
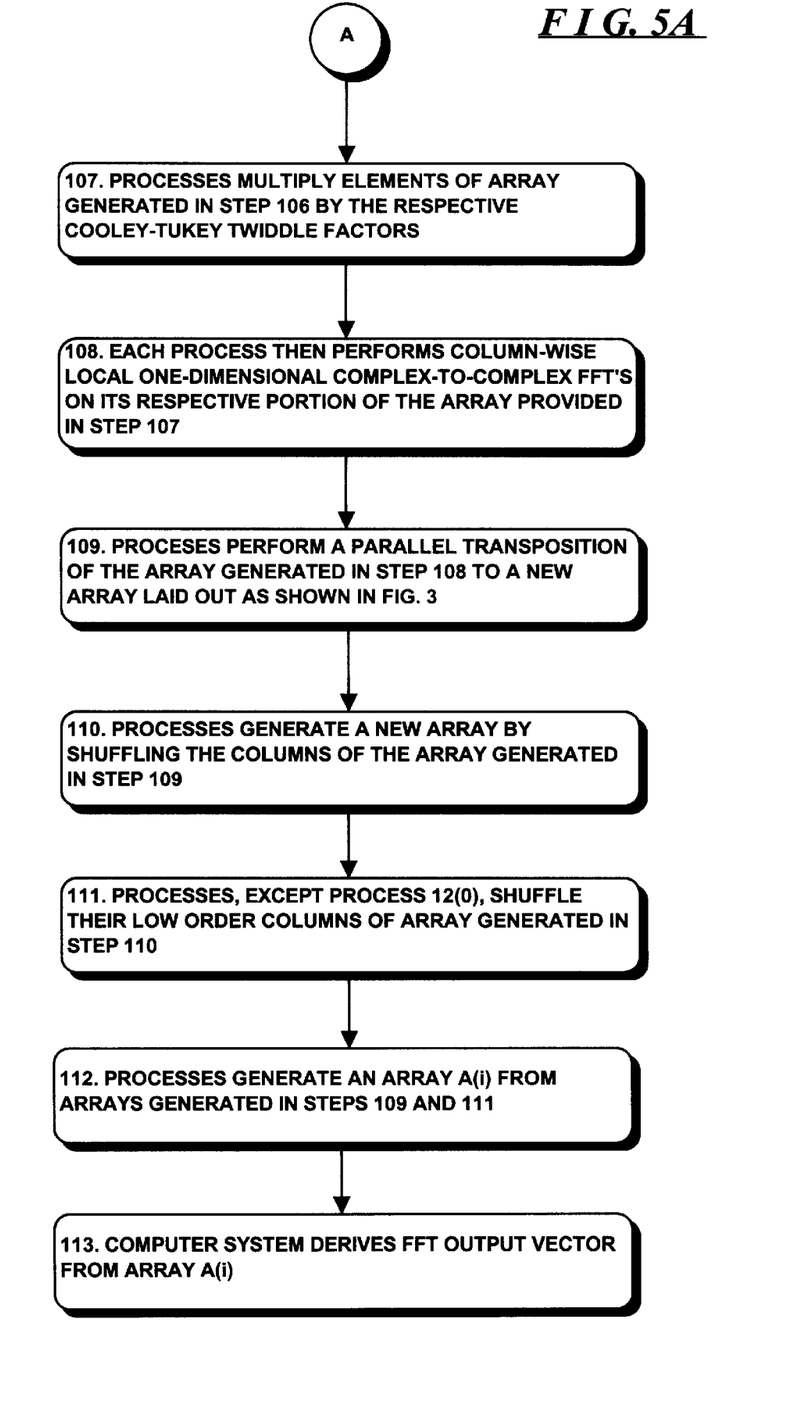

Operations performed by the computer system 10 in connection with performing the parallel FFT operation will be described in connection with the flow chart in FIG. 5. With reference to FIG. 5, in performing the FFT operation in connection with the invention, the computer system 10 initially identifies the number of processes 12(n)(m) which are to be used in the FFT operation (step 100). In the following, the processes which will be used in the FFT operation will be identified by reference numeral 12(0) through 12(P−1) (generally identified by reference numeral 12(p)), where "P" corresponds to the number of processes which will be used in the FFT operation. Thereafter, the components of vector x' will be stored in and aliased to an $n_1$ by $n_2$ $$\left(\text{where } \frac{n}{2} = n_1 x n_2\right)$$

array $x_c^{(0)}$ that is distributed among the identified processes 12(p). Preferably the two factors $n_1$ and $n_2$ are both as large as possible (step 101). In one embodiment, to determine values for factors $n_1$ and $n_2$, the computer system 10, or one of the processes 12(n)(m), initially sets $n_1$ equal to "p" and $n_2$ equal to n/2p. Thereafter, through one or more iterations, as long (i) as $n_2$ remains divisible by two, (ii) $n_2$ is divisible by 4p, and (iii) $n_2$ is greater than $n_1$, the computer system 10 in each iteration divides $n_2$ by two and contemporaneously multiplies $n_1$ by 2. Thereafter, as long as $n_2$ remains divisible by three, the computer system 10 in one or more iterations divides $n_2$ by three and contemporaneously multiplies $n_1$ by three. Subsequently, as long as $n_2$ remains divisible by five, the computer system in one or more iterations divides $n_2$ by five and contemporaneously multiplies $n_1$ by five. The computer system 10 may continue these operations through subsequent prime numbers, seven, eleven and so forth. The array $x_c^{(0)}$ is laid out in memory for the processes 12(p) as shown in FIG. 2, with the various portions of the array, identified by reference numeral 20(p) associated with the respective processes 12(p) being stored in their respective memory regions 13(p).

In addition, the computer system 10, in particular, for example, either a process 12(n)(m), or the individual processes 12(p), generates two sets of "twiddle factors," namely, a set of Coolly-Tukey twiddle factors $w(i_1,i_2)$ (step 102) and a set of real-to-complex twiddle factors $w_{rc}(i_1)$ (step 103), which will be used in the FFT processing operation. In step 102, the Coolly-Tukey twiddle factors $w(i_1,i_2)$ are generated according to $$w(i_1, i_2) = e^{\frac{-2\pi i_1(\left(i_p \frac{n_1}{P}\right)+i_2)}{n_1 n_2}}, \tag{1}$$

for $i_1=0, \ldots, n_1-1$ and $i_2=0, \ldots, n_2/P$ and ip being the rank "p" of the process 12(p) among the set of processes performing the FFT operation. Similarly, in step 103, the real-to-complex twiddle factors are generated according to $$w_{rc}(i_1) = e^{\frac{-2\pi(i_p \frac{n}{2P})+i_1}{n}}, \tag{2}$$

for $i_1 = 0, \ldots, \frac{n}{2P} - 1$.

Figure 3:
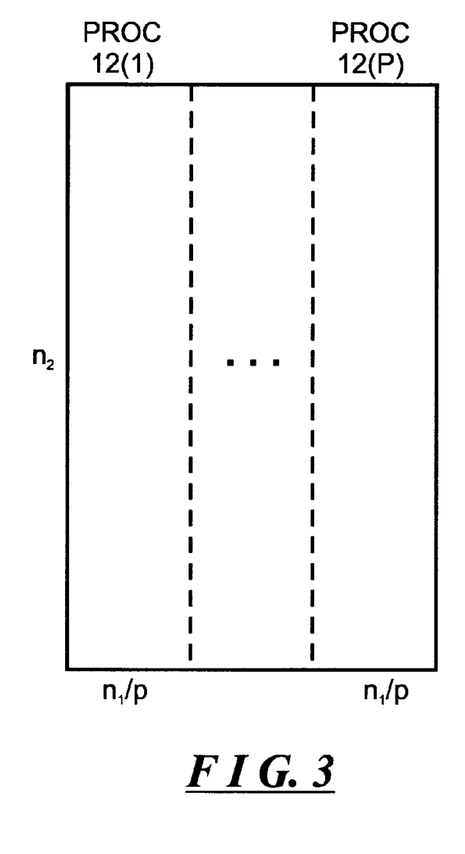

After the array $x_c^{(0)}$ has been established for the processes 12(p) in their respective memory regions 13(p), the processes 12(p) perform aparallel transposition of the array to anew $n_2$ by $n_1$ array $x_c^{(1)}$ laid out as shown in FIG. 3 (step 104). Each process 12(p) then performs $n_1/p$ column-wise local one-dimensional complex-to-complex FFT's of length $n_2$ on its respective portion of the array $x_c^{(1)}$, resulting in an $n_2$ by ni array $x_c^{(2)}$ also laid out as shown in FIG. 3 (step 105). Thereafter, the processes 12(p) perform a transposition of the array $x_c^{(2)}$ to a new $n_1$ by $n_2$ array $x_c^{(3)}$ laid out as shown in FIG. 2 (step 106). The processes 12(p) next multiplies each of the array elements of array $x_c^{(3)}$ by the respective Coolly-Tukey twiddle factor $$x_c(i_1,i_2)=w(i_1,i_2)x_c^{(3)}(i_1,i_2) \quad (3),$$

for $i_1=0, \ldots, n_1-1$, and $i_2=0,$ $$\frac{n_2}{P}-1$$

(step 107).

Figure 4A:
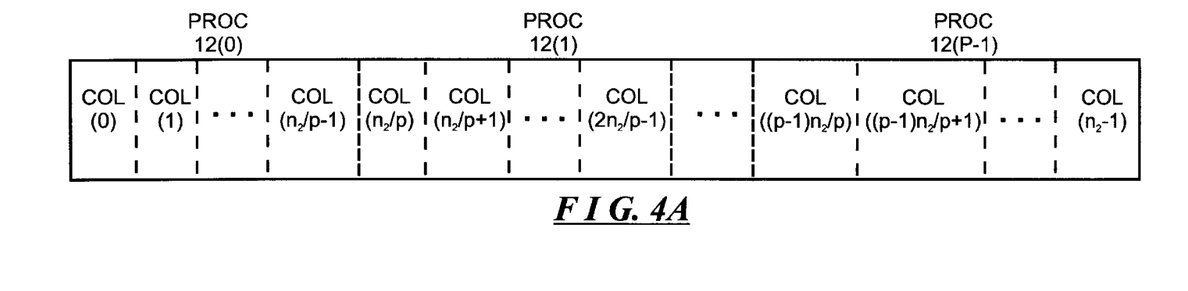
Figure 4B:
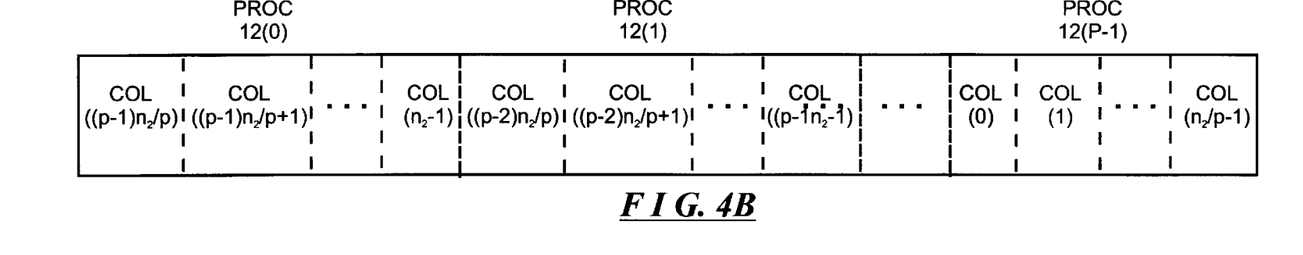

Following step 107, each process 12(p) then performs $n_2/P$ local one-dimensional complex-to-complex FFT's of length $n_1$ column-wise on its respective portion of the array $x_c^{(3)}$, resulting in an $n_1$ by $n_2$ array $x_c^{(4)}$ also laid out as shown in FIG. 2 (step 108). Thereafter, the processes 12(p) perform a transposition of the array $x_c^{(4)}$ to a new $n_2$ by ni array $x_c^{(5)}$ laid out as shown in FIG. 3 (step 109) and generate a new array $x_c^{(6)}$ by shuffling the columns of the array $x_c^{(5)}$ as follows. Initially, each process 12(p) will send all of the columns COL(p) through COL(((p+1)$n_2$/P)-1) in its respective portion of the array to the process 12(P-p-1) (step 110). This will be described in connection with FIGS. 4A and 4B, with FIG. 4A depicting the columns of array $x_c^{(5)}$ as processed by each of the processes 12(0) through 12(P-1), and FIG. 4B depicting the columns of the array $x_c^{(6)}$ processed by each of the processes 12(0) through 12(P-1) following the shuffling in step 110. As shown in FIG. 4A, the portion of array $x_c^{(5)}$ processed by process 12(0) comprises columns COL(0) through COL(($n_2$/P)-1), the portion processed by process 12(1) comprises columns COL($n_2$/P) through COL((2$n_2$/P)-1), and so forth, with the portion processed by process 12(P-1) comprising columns COL(((P-1)$n_2$/P)+1) through COL($n_2$-1). In performing step 110, the process 12(0) will send its columns of array $x_c^{(5)}$ to process 12(P-1) and process 12(P-1) will send its columns to process 12(0) process 12(1) will send its columns to process 12(P-2) and process 12(P-2) will send its columns to process 12(1), and so forth, thereby to form the array $x_c^{(6)}$ as depicted in FIG. 4B, with each COL(v) (v=1, ... P-1) in FIG. 4B referring to the "v-th" column of the array $x_c^{(5)}$.

Figure 4C:
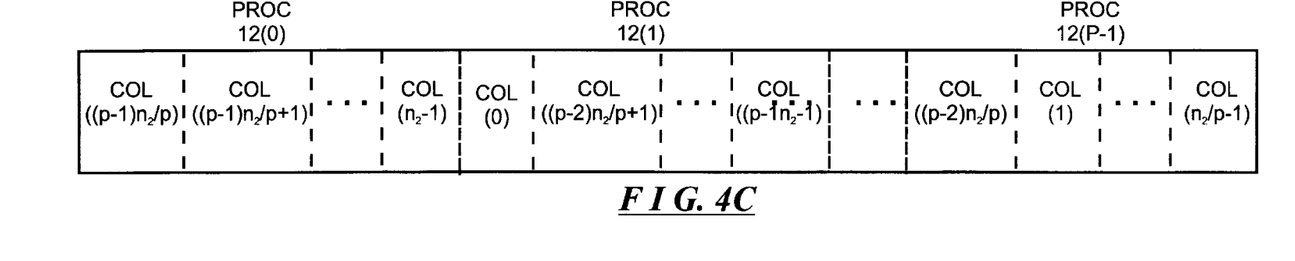

Following step 110, the processes 12(p), except process 12(0), will shuffle the first element of their low order columns COL((P-2)$n_2$/P), ..., COL(0) in array $x_c^{(6)}$ to form an array $x_c^{(7)}$, with each process 12(p) (p≠0) sending the element to process 12(P-p), with the receiving process 12(P-p) storing the element that it receives in the low-order column (step 111). Thus, process 12(1) will send the first elemen of its low-order column COL((P-2)$n_2$/P) to process 12(P-1), and process 12(P-1) will send the first element of its low-order column COL(0), process 12(2) will send the first element of its low-order column COL((P-3)$n_2$/P) to process 12(P-2) and process 12(P-2) will send the first element of its low-order column COL(1) to process 12(2), and so forth, thereby to form the array $x_c^{c(7)}$ as depicted in FIG. 4C, with each COL(v) (v=1, ... P-1) in FIG. 4C referring to the "v-th" column of the array $x_c^{(5)}$.

After the processes 12(p) have generated the array $x_c^{(7)}$, they generate an array A(i) (step 112) as $$A(i) = 0.5\left(\left(x_c^{(5)}(i) + x_c^{(7)\prime}\left(\frac{n}{2P}-i+1\right)\right) - jw_{rc}(i)\left(x_c^{(5)} - x_c^{(7)\prime}\left(\frac{n}{2P}-i+1\right)\right)\right) \quad (4)$$

for $i=1, \ldots, n/2P$, and $x_c^{(7)\prime}(\ )$ referring to the complex conjugate of $x_c^{(7)}(\ )$, and A(0) being generated by process 12(0) follows:

$$A(0)=(\text{real}(x_c^{(5)}(0))+\text{imag}(x_c^{(5)}(0))+j(\text{real}(x_c^{(5)}(0)) -\text{imag}(x_c^{(5)}(0)))(5)$$

and by processes 12(p) (p≠0) as follows:

$$A(0)=0.5((x_c^{(5)}(0)+x_c^{(7)\prime}(0))-jw_{rc}(0)(x_c^{(5)}(i)x_c^{(7)}(0))') \quad (6),$$

with $(x_c^{(5)}(i)-x_c^{(7)}(0))'$ referring to the complex conjugate of $(x_c^{(5)}(i)-x_c^{(7)}(0))$.

The complex array A(i) generated in step 112 is the packed representation of the result of the real-to-complex FFT of the original data vector x. The FFT vector x can be derived from array A(i) in a conventional manner (step 113). In particular, (i) components x(0) and x(n/2) of vector x are the real and imaginary part of array A(0), (ii) elements A(i), i=1, $$\frac{n}{2}-1,$$

of array A(i) contain components x(i), i=1, ... , $$\frac{n}{2}-1,$$

and (iii) elements x(i), i=n/2, ... , n-1 can be obtained from array A(i) by applying the well-known conjugate symmetric property of x.

The invention provides a number of advantages. In particular, the invention provides a system and method for performing a real-to-complex fast Fourier transform by a plurality of processes in parallel.

It will be appreciated that a number of modifications may be made to the parallel FFT system as described herein. For example, although the parallel FFT system has been described as comprising a plurality of SMP's, it will be appreciated that the system may comprise a single SMP, and/or a computer constructed in accordance with the distributed-memory architecture. The processes may send information, including, for example, the array components as described above, thereamong using any conventional information transfer mechanism.

In addition, it will be appreciated that, although the processes have been described as performing operations in a particular order, described above in connection with FIG. 5, at least some of the operations may be performed in a different order. For example, the particular order in which the Coolly-Tukey and real-to-complex twiddle factors are generated, and the point in the sequence at which they are generated may differ from that described above in connection with FIG. 5.

The parallel FFT system described herein can perform the matrix transpose operations using any convenient methodology, including, for example, the methodology described in U.S. patent application Ser. No. 09/337,585, filed on even date herewith in the names of George Kechriotis, et al., entitled System and Method for Allocating and Using Arrays in a Shared-Memory Digital Computer System, assigned to the assignee of the present application and incorporated herein by reference.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A method for computing the fast Fourier transform (FFT) of a real-valued input vector of length n, the method comprising:
   (a) storing the real-valued input vector as an $n_1 \times n_2$ complex source array partitioned among P processes, wherein the product of $n_1$ and $n_2$ equals n/2;
   (b) said P processes operating on the $n_1 \times n_2$ complex source array in a parallel fashion to compute an $n_1 \times n_2$ complex intermediate array which represents the FFT of the $n_1 \times n_2$ complex source array;
   (c) said P processes operating on the $n_1 \times n_2$ complex intermediate array in a parallel fashion to compute an output vector representing the FFT of the real-valued input vector.

2. The method of claim 1, wherein $n_2$ is divisible by P, wherein each of the P processes is initially allocated a corresponding $n_1 \times (n_2/P)$ local subarray of the $n_1 \times n_2$ complex source array.

3. The method of claim 1, wherein n is divisible by 4*P*P.

4. The method of claim 1, wherein (b) comprises said P processes performing one or more parallel transposition operations.

5. The method of claim 1, wherein (b) comprises:
   said P processes performing a first set of column-wise FFT operations in parallel;
   said P processes performing a parallel transposition operation; and
   said P processes performing a second set of column-wise FFT operation in parallel.

6. The method of claim 1, wherein (b) comprises:
   said P processes performing a parallel transposition of the source array to generate a first transposed array;
   each of said P processes performing columnwise FFTs in parallel on the columns of a corresponding portion of the first transposed array resulting in a first intermediate array;
   said P processes performing a parallel transposition of the first intermediate array to generate a second transposed array;
   said P processes multiplying elements of the second transposed array by corresponding Coolly-Tukey twiddle factors in parallel to generate a product array;
   said P processes performing columnwise FFTs in parallel on the columns of a corresponding portion of the product array resulting in a second intermediate array;
   said P processes performing a parallel transposition of the second intermediate array to generate the complex intermediate array.

7. The method of claim 6, wherein (c) comprises each of said P processes multiplying elements of a corresponding local portion of the complex intermediate array by real-to-complex twiddle factors in parallel.

8. The method of claim 1, wherein (c) comprises performing complex multiplications, complex conjugations, additions and subtractions in parallel to determine elements of the output vector.

9. The method of claim 1, wherein (c) comprises performing a first set of data exchanges wherein an $I^{th}$ process of said P processes sends the corresponding local portion of the complex intermediate array to a $(P-i-I)^{th}$ process of said P processes, where I takes values in the range 0, 1, 2, . . . , P–1.

10. The method of claim 9, wherein (c) comprises performing a second set of data exchanges wherein the $I^{th}$ process of said P process sends a zeroeth element of the corresponding local portion of the complex intermediate array to a $(P-I)^{th}$ process of said P processes, where I takes values in the range 1, 2, 3, . . . , P–1.

11. The method of claim 1, wherein the output vector represents n/2 elements of the FFT of the input vector.

12. The method of claim 1, wherein the output vector is used as part of a signal processing operation.

13. A method comprising:
   receiving an input vector comprising a sequence of n real quantities;
   performing a complex-to-complex one-dimensional FFT of size n/2 on the input vector using P processes executing in parallel resulting in an intermediate complex array of size n/2;
   performing processing operations on the intermediate complex array resulting in a final output array which represents at least n/2 elements of the real-to-complex FFT of the input vector.

* * * * *

UNITED STATES PATENT AND TRADEMARK OFFICE
CERTIFICATE OF CORRECTION

PATENT NO. : 6,532,484 B1 Page 1 of 1
DATED : March 11, 2003
INVENTOR(S) : George Kechriotis It is certified that error appears in the above-identified patent and that said Letters Patent is hereby corrected as shown below:

Column 8,
Line 5, please delete "Coolly-Tukey", and replace with -- Cooly-Tukey --.
Line 24, please delete "(P-i-I)", and replaced with -- (P-1-I) --.

Signed and Sealed this

Nineteenth Day of August, 2003

JAMES E. ROGAN
*Director of the United States Patent and Trademark Office*